(12) United States Patent
Martin

(10) Patent No.: US 8,560,723 B2
(45) Date of Patent: Oct. 15, 2013

(54) STREAM GENERATING DEVICE, METHOD FOR CALCULATING INPUT BUFFER PADDING LEVEL INSIDE THE DEVICE AND STREAM CONTROL METHOD

(75) Inventor: Gael Martin, Rennes (FR)

(73) Assignee: Enensys Technologies, Rennes (FR)

( * ) Notice: Subject to any disclaimer, the term of this patent is extended or adjusted under 35 U.S.C. 154(b) by 151 days.

(21) Appl. No.: 13/002,375

(22) PCT Filed: Jul. 2, 2009

(86) PCT No.: PCT/EP2009/058344
§ 371 (c)(1),
(2), (4) Date: Mar. 15, 2011

(87) PCT Pub. No.: WO2010/000810
PCT Pub. Date: Jan. 7, 2010

(65) Prior Publication Data
US 2011/0185080 A1    Jul. 28, 2011

(30) Foreign Application Priority Data

Jul. 3, 2008   (FR) ..................................... 08 54516

(51) Int. Cl.
*G06F 15/16*   (2006.01)
(52) U.S. Cl.
USPC ...................... 709/234; 370/395.64; 370/415
(58) Field of Classification Search
USPC .............. 709/234; 370/395.64, 412–418, 516
See application file for complete search history.

(56) References Cited

U.S. PATENT DOCUMENTS

| 6,721,328 | B1* | 4/2004 | Nichols et al. | 370/395.62 |
| 8,218,579 | B2* | 7/2012 | Liu et al. | 370/517 |
| 2002/0154640 | A1 | 10/2002 | Wei | |
| 2009/0103609 | A1* | 4/2009 | Jiang et al. | 375/240.03 |

OTHER PUBLICATIONS

Preliminary Examination Report, mailed Mar. 16, 2011, for PCT/EP2009/058344; cited reference already mentioned in previous invention disclosure statement.
International Search Report for PCT/EP2009/058344 mailed Jul. 28, 2009.
Written Opinion for PCT/EP2009/058344 mailed Jul. 28, 2009.

* cited by examiner

*Primary Examiner* — Jeffrey M Rutkowski
*Assistant Examiner* — Peter Mak
(74) *Attorney, Agent, or Firm* — Nixon & Vanderhye, PC

(57) ABSTRACT

The present invention concerns a method of calculating a filtered filling level of the input buffer of a gateway generating a data stream from a received data stream resisting the jitter of the stream received. It applies more particularly to a gateway receiving an MPEG (Moving Picture Experts Group) transport stream received according to the IP protocol (Internet Protocol) and retransmitted over an ASI interface (Asynchronous Serial Interface).

Figure 1:
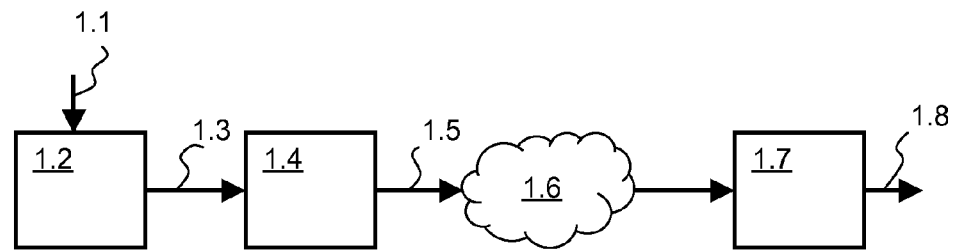

The invention proposes a method of calculating a filtered filling level of the input buffer resisting the jitter of the stream received. The received stream passing through an input buffer, the method is based on a regulation as a function of the maximum level of the buffer evaluated over a period of time, making it possible to protect against the effects of the jitter introduced into the received stream.

5 Claims, 3 Drawing Sheets

STREAM GENERATING DEVICE, METHOD FOR CALCULATING INPUT BUFFER PADDING LEVEL INSIDE THE DEVICE AND STREAM CONTROL METHOD

This application is the U.S. national phase of International Application No. PCT/EP2009/058344, filed 2 Jul. 2009, which designated the U.S. and claims priority to French Application No. 08/54516, filed 3 Jul. 2008, the entire contents of each of which are hereby incorporated by reference.

The present invention concerns a method of calculating a filtered filling level of the input buffer of a gateway generating a data stream from a received data stream resisting the jitter of the stream received. It applies more particularly to a gateway receiving an MPEG (Moving Picture Experts Group) transport stream received according to the IP protocol (Internet Protocol) and retransmitted over an ASI interface (Asynchronous Serial Interface).

In studios, professional equipment traditionally exchanges digital television data streams in the form of MPEG transport streams via ASI asynchronous serial interfaces. The importance gained during the past few years by data transmission networks in the IP family and the need to transmit these digital television streams over long distances or to multiple items of equipment creates the need to transfer the streams between these two worlds. Gateways have therefore appeared, enabling streams to be transferred between the ASI world and the IP world.

The transmission of a stream via an ASI interface is characterised by a transmission rate and speed of the data being controlled. The drawback lies in a short distance and the limitation of the possibilities for routing the stream. Conversely, the transmission of a stream over an IP network makes it possible to achieve long distances and to achieve broadcast routings in a very flexible manner. The drawback is that the rate is not guaranteed and that the transfer of the data packets may suffer losses and duplications, and the transmission of the stream is subject to the introduction of jitter.

These features are not a problem for a gateway from ASI to IP. In this case, a well-timed data stream at constant rate is received, which is used to generate a regular stream of IP packets, also well-timed, which is sent over the IP network. On the other hand, the design of IP to ASI gateways requires managing problems of rate, speed, loss and jitter that may affect the stream after transmission thereof by an IP network in order to generate as an output an ASI stream that must be at a constant rate and controlled speed.

The problems of potential loss, duplication and reversal of packets being assumed to be solved, the known methods of regulating the rate of the ASI stream generated are affected by the jitter introduced by the IP network.

This method affords reliable regulation of the output rate of the ASI stream generated despite the jitter of the stream received. In addition, this method is not greedy in terms of time and computing resources. It can therefore be introduced at low cost in the IP to ASI gateway. Although developed in the context of a gateway for MPEG streams between the IP world and the ASI world, the invention can apply in any gateway that is to generate a stream at constant rate from a stream received in the form of data packets suffering jitter.

The invention concerns a device for generating an output data stream from an input data stream, the data of the input stream being received in the form of data packets, these data packets being stored on reception thereof in an input buffer, the output stream being generated by the consumption of the data stored in the input buffer, the moments of reception of the data packets of the input stream being affected by jitter, comprising means of calculating a filtered filling level of the input buffer, which comprise:
  means of defining an analysis period the duration of which is greater than the maximum jitter affecting the input stream;
  means of calculating the filtered filling level of the input buffer as being the maximum of the instantaneous filling level over the analysis period preceding the moment of calculation.

The invention also concerns a method of calculating a filling level of an input buffer in a device for generating an output data stream from an input data stream, the data of the input stream being received in the form of data packets, these data packets being stored on reception thereof in an input buffer, the output stream being generated by the consumption of the data stored in the input buffer, the moments of reception of the data packets of the input stream being affected by jitter, comprising a step of defining an analysis period the duration of which is greater than the maximum jitter affecting the input stream; a step of calculating the filtered filling level of the input buffer as being the maximum of the instantaneous filling level over the analysis period preceding the moment of calculation.

According to a particular embodiment of the invention, the instantaneous filling level is obtained by a step of calculating the instantaneous filling level of a virtual input buffer, the calculation being done when each data packet arrives, by adding the quantity of data received and subtracting the quantity of data theoretically consumed since the previous calculation step.

According to a particular embodiment of the invention, the method also comprises a step of storing the moment associated with the maximum adopted as the value of the filtered filling level of the input buffer.

The invention also concerns a method of regulating the useful rate of the stream generated by a device as described above, in which the regulation is done by slaving on a predefined target value of the filtered filling level of the input buffer calculated as described previously.

The invention also concerns a method of calculating the drift of the internal clock of a device as described previously, comprising a step of estimating the slope of the curve of the filtered filling level calculated as described previously.

The invention also concerns a method of calculating the jitter of the stream received by a device as described previously, comprising a step of calculating the minimum of the filtered filling level of the input buffer of the device over the analysis period, the value of the jitter being obtained by dividing the difference between the maximum and the minimum by the rate of the stream.

Figure 2:
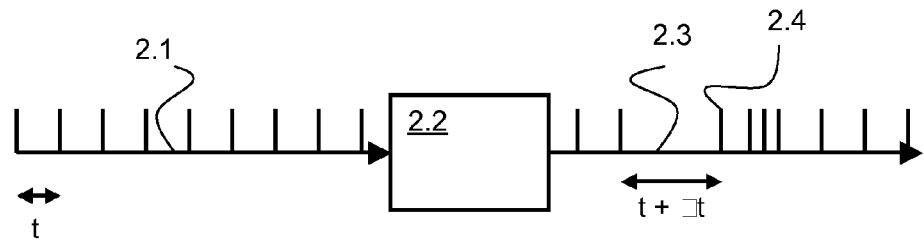
Figure 3:
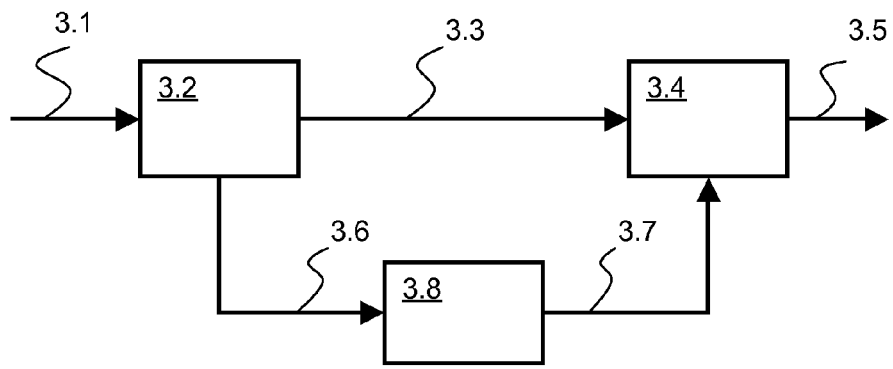
Figure 4:
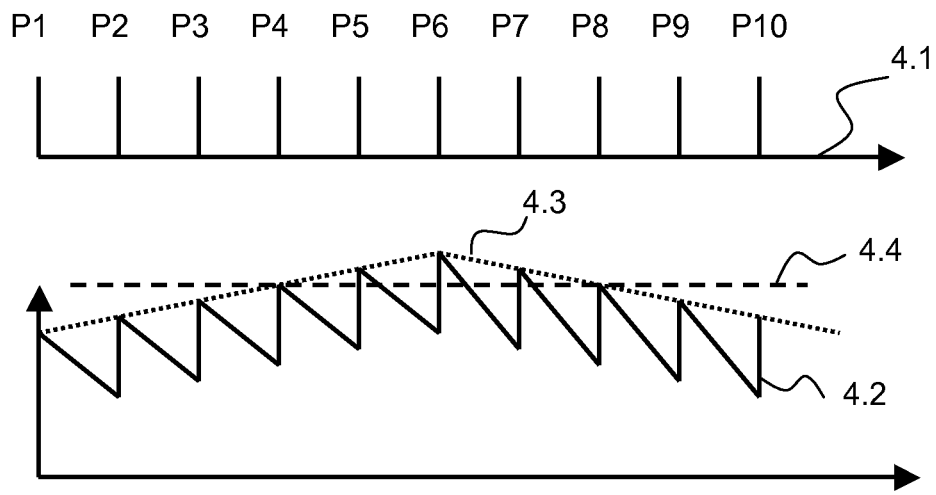
Figure 5:
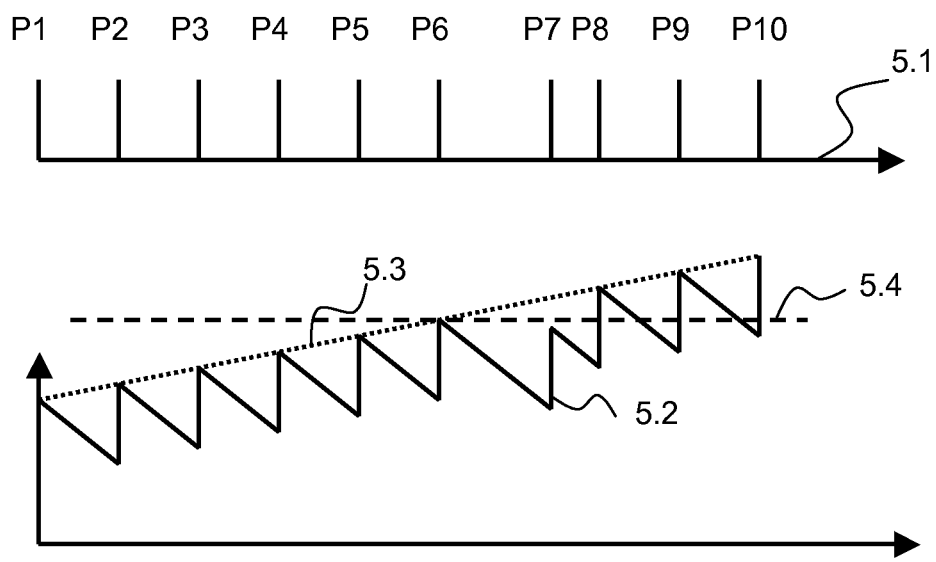
Figure 6:
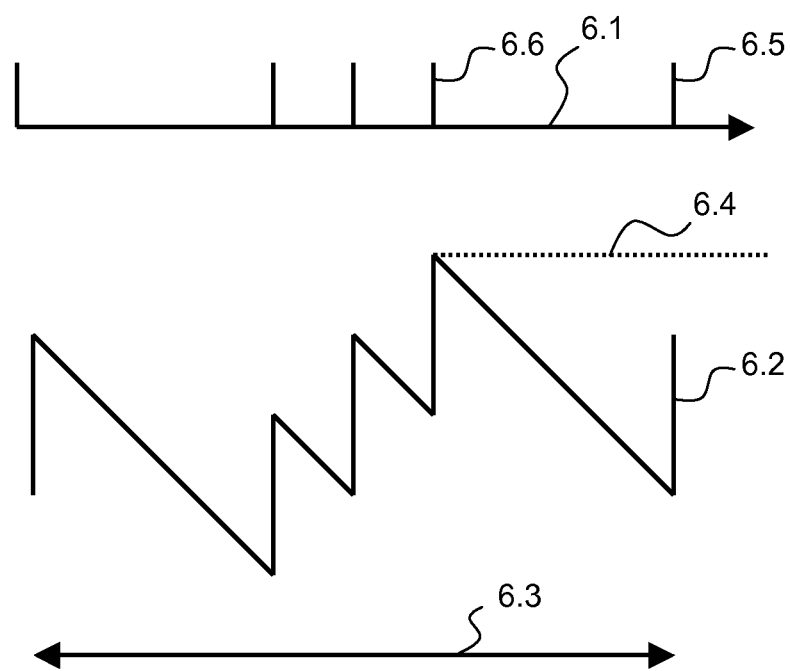

The abovementioned features of the invention, as well as others, will emerge more clearly from a reading of the following description of an example embodiment, the said description being given in relation to the accompanying drawings, among which:

FIG. 1 illustrates an example of a stream broadcasting architecture using a gateway according to the invention, FIG. 2 illustrates the phenomenon of jitter, FIG. 3 illustrates an example embodiment of a gateway according to the invention, FIG. 4 illustrates the change in the level of the input buffer in the absence of jitter, FIG. 5 illustrates the change in the level of the input buffer in the presence of jitter, FIG. 6 illustrates the change in the level of the input buffer in the presence of jitter over a period according to the invention.

FIG. 1 illustrates an example of a stream broadcasting architecture using a gateway according to the invention. In this example, a source 1.2 can be seen, which generates an ASI data stream 1.3. This source receives a reference clock signal for the generation of the stream, for example the 10 MHz clock emitted by the GPS system. The useful rate of the stream sent is constant. The useful rate is defined by the rate of MPEG data packets in the stream. The ASI data stream 1.3 is then transferred over the IP network 1.6 by the ASI to IP gateway 1.4. This gateway generates a stream 1.5 of IP packets containing from 1 to 7 MPEG TS (Transport Stream) data packets. The IP packets are sent in accordance with the speed of the ASI stream received. Having arrived at its destination, the IP stream is then once again transformed in the form of an ASI stream 1.8 by the IP ASI gateway 1.7.

The IP network 1.6 generates a set of disturbances on the data transported. Firstly, the network may be at the origin of a loss of packets, duplication or reversal of packets. These disturbances are ignored since the solution thereto is known. It is possible, when the IP network is controlled as is the case when it is used in a studio for example, to size this network so as to be certain that these disturbances will not occur. This is because they occur when certain routing nodes are saturated between the source and the destination. In this case, packets may be lost or saturation may give rise to different routing decisions for the packets that lead to different transport times and therefore to possible reversals in the order of packets transmitted. In a limited context where the network is controlled, a generous sizing of the routing nodes and of the connections makes it possible to avoid these problems. When this is not the case, the use of control protocols such as RTP makes it possible to correct duplications and reversals of packets. It is also possible to protect the packets by means of error correctors, for example an FEC (Forward Error Correction) code, which adds redundancy enabling any lost packets to be reconstructed. The use of these mechanisms makes it possible to assume that there will be a stream without loss, duplication or reversal of packets.

Moreover, a delay is due to the time taken by the packets to transit the network. This delay can be modelled as being the addition of a fixed propagation time, identical for all the packets, and a jitter factor consisting of a random delay affecting each packet independently. This is illustrated by FIG. 2. A regular stream 2.1 can be seen therein, containing data packets sent at an interval of time t. This stream is then transmitted by a network 2.2 introducing jitter. It can be seen that the data packet 2.4 that should have been transmitted at a time t after the previous packet is in fact transmitted at a time t+Δt. Here, Δt represents the jitter affecting the packet 2.4.

The delay due to the fixed propagation time, at least as long as it remains reasonable, does not generally pose any problem. It can be treated as a latency time. For example, in an SFN (Single Frequency Network) broadcasting network, as long as the total latency of the chain does not exceed one second, it does not affect the synchronisation mechanisms between senders and does not give rise to any consequence threatening the functioning of the system.

We shall see that the same does not apply to the phenomenon of jitter, in particular for mechanisms regulating the useful rate of the stream generated.

FIG. 3 illustrates the functioning of the IP ASI gateway. It receives as an input the stream 3.1, which is read in an input buffer 3.2. This input stream is received in the form of data packets that are stored on reception thereof in the buffer. This buffer is read, byte by byte 3.3, by the module 3.4 generating the output ASI stream 3.5. The filling level of the input buffer 3.2 is monitored and monitoring information 3.6 is transmitted to a regulation module 3.8. This module generates regulation parameters 3.7 intended for the module 3.4 generating the output stream.

The useful rate of the output stream is defined as follows. The ASI signal is a serial signal sent according to a 270 MHz bit clock. The data are transmitted in packets of 8 bits in accordance with an 8 bit to 10 bit coding by means of a coding alphabet in order to make the transmission more reliable. A data rate of 216 Mbit/s is therefore obtained.

Synchronisation words are regularly inserted between the TS packets transmitted. The term inter-packet synchronisation words is used. Synchronisation words are also inserted between the bytes within a TS packet. The term inter-byte synchronisation words is then used. These synchronisation words are interpreted as stuffing data for adjusting the useful rate of the stream according to a total rate of 216 Mbit/s as we have seen.

It is assumed that the rate of the input stream defining the theoretical useful rate of the stream generated is known. It is generally obtained by means of SFN signalling information or measured during an initial rate estimation step. A method of estimating the rate using the invention is described below.

The stream generated at the output of the gateway uses a clock for timing the insertion of useful data over the ASI link. This clock is generated by a controllable oscillator, for example an NCO (Numerical Controlled Oscillator). A VCO (Voltage Control Oscillator) may also be used, from an internal clock and a clock adjustment value called nco. According to this method, the useful rate is then defined by the formula:

$$Rate = K/nco;$$

where K is a constant proportional to the frequency of the internal oscillator.

The internal clock of the gateway serving as a reference is never perfect and therefore suffers a drift over time. This drift is also affected by conditions of use such as ambient temperature, the ageing of the component and the like. Maintenance of the useful rate of the stream generated therefore requires a regulation mechanism, which may be done for example by slaving to the input rate of the stream as the mechanism known by the term PID (Proportional, Integral and Derivative) control mechanism.

This PID control is effected according to the instantaneous filling level of the input buffer. This filling level of the input buffer changes in a sawtooth pattern as illustrated in FIG. 4. In this figure, the top part 4.1 represents the moments of reception of an IP packet over time. The bottom part 4.2 represents the change in the filling level of the buffer. When an IP packet is received, it contains a certain number of bytes corresponding to a number from 1 to 7 TS packets, each containing 188 bytes. These data are written in the buffer, which is represented by the vertical lines of the curve 4.2. Between the moments of reception of an IP packet, the bytes are consumed regularly by the module generating the stream according to the rate presented above. This mechanism is represented by the oblique decrease in the curve 4.2. The measurement of the instantaneous level 4.3 of the buffer is defined by the measurement of the level just after the writing of an IP packet. This so-called instantaneous level therefore corresponds to the level at the top of a sawtooth. Control can therefore take place by fixing a target level 4.4 and modifying the adjustment value of the clock nco according to the instantaneous filling level with respect to this target level. When the instantaneous filling level is greater than the target level, the value of nco is reduced, which has the affect of increasing the useful rate of the stream generated and therefore emptying the buffer. When the instantaneous filling level is below the target level, the value of nco is increased, which has the affect of reducing the useful rate of the stream generated and therefore filling the buffer. A correction proportional to the error between the effective level and the target filling level of the buffer is therefore applied to the value of nco. The effective filling level of the buffer is therefore maintained substantially at the target level and in this way a slaving of the useful rate of the stream generated to the rate of the received stream is obtained.

This mechanism functions well in the absence of jitter, as illustrated in FIG. 4. The introduction of jitter at the moment of arrival of the IP packets influences the filling level of the input buffer as illustrated in FIG. 5. In this figure, the packet P7 arrives late and therefore suffers jitter. It can be seen in the, figure that the consequence is that the buffer emptying phase after reception of the packet P6 therefore continues for longer, and the level of the buffer after reception of the packet P7 is therefore less than what it would have been if the packet had been received on time. It can be seen in the figure that this level is situated below the target level 5.4 when it should have been situated above. A decision to correct the rate at this moment will therefore be falsified and will tend to decrease the useful rate of the stream whereas the filling level of the buffer tends to increase, which accentuates the drift.

One possible solution to this problem consists of effecting the control not on the instantaneous filling level of the buffer but on an exponential mean of this level. This exponential mean $V_i$ is then calculated at the moment of reception of an IP packet i as:

$$V_i = a.v_i + (1-a).v_{i-1};$$

where $v_i$ represents the instantaneous filling level of the buffer after reception of the IP packet i and a a parameter the value of which is to be taken between 0 inclusive and 1 exclusive. It may be noted that the value a=1 would correspond to the instantaneous level.

It will be noted that, if the value a used is low, that is to say close to 0, a small error is introduced on the calculation of the filling level of the buffer but it takes a long time to converge towards the value corresponding to reception without jitter. Conversely, if a is close to 1, a high error is introduced, but convergence takes place more quickly. It can be seen that the jitter introduces a high deviation of the exponential mean that requires using small values of a and therefore a long slaving time and a high slaving amplitude is obtained. The long convergence time also introduces a significant phase shift.

Another solution to this problem consists of defining a period of time called the analysis period with a duration greater than the maximum jitter of the received stream and taking as the value of the filling level of the buffer, herein referred to as the filtered filling level, the maximum of this level during the analysis period preceding the moment of calculation. FIG. 6 illustrates this solution. The curve 6.1 is found indicating the moments of reception of the packets and the curve 6.2 of the filling level of the input buffer. The curve is drawn during a period of time 6.3 that corresponds to the analysis period defined as greater than the maximum jitter of the received stream. At the time corresponding to the moment of reception of the packet 6.5, the filtered filling value of the buffer, used for the rate regulation, is therefore defined as the maximum of the filling level during the analysis period 6.3, that is to say the level 6.4. This value can be calculated at the end of the analysis period or more frequently each time packets are received using a sliding analysis period. It can be seen that the filtered value 6.4 is therefore the value adopted for calculating the filtered filling level of the buffer as calculated at the moment of reception of the packet 6.5. However, this value corresponds in reality to the moment of arrival of the packet 6.6. This method therefore causes a slight shift in time, since a value is allocated, to the moment of the end of the analysis period, that corresponds in reality to a moment during the period. Advantageously, it is possible to store in addition to this maximum value of the filling level of the buffer during the period the corresponding moment so as to be able to use this moment instead of the moment of calculation in certain applications of this calculation method.

This method makes it possible to soften the irregularities in the input buffer filling level curve introduced by the jitter in the stream received. It also has the advantage of being very simple to implement and not requiring many resources. This method therefore makes it possible to regulate the useful rate of the outgoing stream in continuous mode. It is also possible to use it to estimate the drift of the clock. In this case, the clock adjustment variable is not modified and the change in the filtered filling level of the buffer is measured by the maximum method described above. It is then possible to use a linear regression, for example the method of least squares, to estimate the slope of the buffer filling level change curve and to deduce therefrom the clock drift. Advantageously, this method of estimating the slope of the curve of the buffer filling level uses the storage of the moment associated with the filtered filling level adopted. The points then adopted are actually on the curve the slope of which it is sought to estimate, unlike the points adopted by associating the maximum on the period at the moment of the end of the period.

An additional measurement of the minimum filling level of the buffer over the period makes it possible to precisely measure the jitter of the stream received. This is because this jitter corresponds to the difference between the maximum and the minimum divided by the rate.

The invention can also advantageously be used to calculate the rate of the incoming stream. In this case, independently of the generation of the outgoing stream, a first approximate value of the rate of the incoming stream is calculated. The consumption of the data of the input buffer is then fixed according to this approximate value. It is not necessary to actually generate the output stream in this case. An estimation is then made of the slope of the curve of the buffer filling level according to the invention. This curve undergoes a drift according to a slope that depends on the error between the actual rate of the input stream and the approximate value used for the consumption of the buffer. This value is then refined in order to calculate the precise rate of the input stream. Advantageously, the generation of the output stream not being necessary to this calculation, it is possible to use a virtual input buffer instead of the actual buffer. In this case, the instantaneous filling level that the actual input buffer would have had is maintained by calculation. It suffices, when each data packet arrives, to update this value by a calculation step consisting of an updating of the instantaneous filling level of the virtual buffer by adding to it the quantity of data received and subtracting from it the quantity of data consumed in the interval of time since the last calculation step. In this way an instantaneous filling level of the buffer is obtained that can be used in the invention for calculating the filtered filling level of the buffer.

The invention can be used in any type of device implementing a rate regulation between an incoming stream and an outgoing stream if these streams are in CBR (Constant Bit Rate) mode, that is to say at a constant rate. It is therefore not limited to the field of the transportation of MPEG video but can be applied to any data stream at a constant rate, video, audio or voice over IP. It can also be used in the context of the regulation of generic routing nodes whatever the transport protocol used, such as ATM or the like.

The invention claimed is:

1. Method of calculating a filling level of an input buffer in a device for generating an output data stream from an input data stream, the input data stream comprising:

Moving Picture Experts Group Transport stream data packets, the moments of reception of the Moving Picture Experts Group Transport stream data packets being affected by jitter, the Moving Picture Experts Group Transport stream data packets being stored on reception thereof in an input buffer, the output stream being generated by the consumption of the Moving Picture Experts Group Transport stream data packets stored in the input buffer, the output stream being transferred through an asynchronous serial interface, comprising the following steps:

calculating a filling level of the input buffer, the means for calculating comprising:

a step of defining an analysis period the duration of which is greater than the maximum jitter affecting the input stream;

a step of calculating the filling level of the input buffer as being the maximum of the instantaneous filling level over the analysis period;

a step of calculating the first filling level of the input buffer;

a step of calculating the second filling level of the input buffer as being the minimum of the instantaneous filling level over the analysis period preceding the moment of calculation; and a step of calculating the value of the jitter obtained by dividing the difference between the first and second filling levels by the rate of the input stream.

2. Method according to claim 1, wherein the instantaneous filling level is obtained by a step of calculating the instantaneous filling level of a virtual input buffer, the calculation being done when each data packet arrives, by adding the quantity of data received and subtracting the quantity of data theoretically consumed since the previous calculation step.

3. Method according to claim 1, wherein it also comprises a step of storing the moment associated with the maximum adopted as the value of the filling level of the input buffer.

4. Method according to claim 1, wherein a regulating the useful rate of the output data stream is done by slaving on a predefined target value of the filling level of the input buffer.

5. Method according to claim 1 comprising a step of calculating the drift of an internal clock of the device for generating an output data stream from an input data stream, by estimating the slope of the curve of the filling level.

* * * * *